(12) United States Patent
Sheridan et al.

(10) Patent No.: US 8,394,175 B2
(45) Date of Patent: Mar. 12, 2013

(54) CARBON MEMBRANES FROM CELLULOSE ESTERS

(75) Inventors: Edel Sheridan, Trondheim (NO); Tone Borge, Trondheim (NO); Jon Arvid Lie, Trondheim (NO); May-Britt Hagg, Trondheim (NO)

(73) Assignee: MemfoACT AS

( * ) Notice: Subject to any disclaimer, the term of this patent is extended or adjusted under 35 U.S.C. 154(b) by 345 days.

(21) Appl. No.: 12/988,709

(22) PCT Filed: Apr. 20, 2009

(86) PCT No.: PCT/EP2009/002872
§ 371 (c)(1),
(2), (4) Date: Dec. 7, 2010

(87) PCT Pub. No.: WO2009/129984
PCT Pub. Date: Oct. 29, 2009

(65) Prior Publication Data
US 2011/0072965 A1 Mar. 31, 2011

(30) Foreign Application Priority Data
Apr. 21, 2008 (GB) .................................. 0807267.0

(51) Int. Cl.
*B01D 53/22* (2006.01)
(52) U.S. Cl. ................. 95/47; 95/43; 95/45; 96/4; 96/8; 96/10
(58) Field of Classification Search ................ 95/43, 45, 95/47; 96/4, 8, 10
See application file for complete search history.

(56) References Cited

U.S. PATENT DOCUMENTS 2,003,696 A * 6/1935 Palmer ............................ 536/61
2,059,422 A * 11/1936 Weinberg ................... 139/426 R
2,387,354 A * 10/1945 Reed .............................. 442/381
2,647,816 A * 8/1953 Battista ......................... 8/155.2
4,111,701 A * 9/1978 Franko-Filipasic et al. ......................... 106/18.15
4,543,221 A 9/1985 Chen et al.
4,685,940 A 8/1987 Soffer et al.
7,947,114 B2 * 5/2011 Hagg et al. ........................ 95/51
2008/0078290 A1 * 4/2008 Hagg et al. ........................ 95/51

FOREIGN PATENT DOCUMENTS

| GB | 1195384 | 6/1970 |
| GB | 2207666 | 2/1989 |
| JP | 2001009247 | 1/2001 |
| WO | 2007017650 | 8/2006 |

OTHER PUBLICATIONS

Shigeru et al. JP 2001009247 machine translation, Jan. 16, 2001.*
International Search Report and Combination Written Opinion in re PCT/EP2009/002872, mailed Jul. 30, 2009.
Liu and Hsieh, "Ultrafine Fibrous Cellulose Membranes from Electrospinning of Cellulose Acetate," Journal of Polymer Science: Part B: Polymer Physics, vol. 40, 2119-2129 (2002).
Son et al., "Electrospinning of Ultrafine Cellulose Acetate Fibers: Studies of a New Solvent System and Deacetylation of Ultrafine Cellulose Acetate Fibers," Journal of Polymer Science: Part B: Polymer Physics, vol. 42, 5-11 (2004).

* cited by examiner

*Primary Examiner* — Jason M Greene
*Assistant Examiner* — Anthony Shumate
(74) *Attorney, Agent, or Firm* — Gardner Groff Greenwald & Villanueva, P.C.

(57) ABSTRACT

A process for the production of a carbon hollow fiber membrane comprising:
(i) dissolving at least one cellulose ester in a solvent to form a solution;
(ii) dry/wet spinning the solution to form hollow fibers;
(iii) deesterifying said hollow fibers with a base or an acid in the presence of an alcohol;
(iv) if necessary, drying said fibers;
(v) carbonizing the fibers;
(vi) assembling the carbonized fibers to form a carbon hollow fiber membrane.

18 Claims, 2 Drawing Sheets

CARBON MEMBRANES FROM CELLULOSE ESTERS

IN THE CROSS-REFERENCE TO RELATED APPLICATIONS

Figure 1:
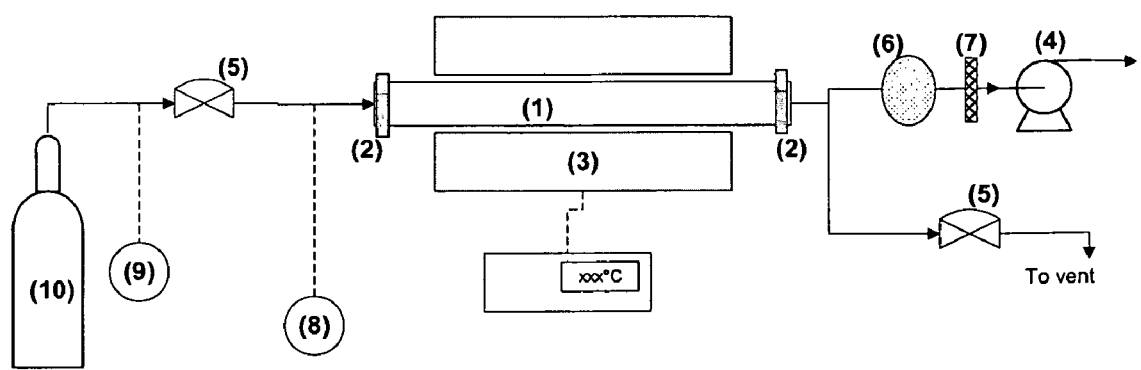

This application claims priority to United Kingdom Application No. GB0807267.0 filed Apr. 21, 2008, which is hereby incorporated herein by reference in its entirety for all purposes. This application has priority to PCT/EP09/02872.

This invention relates to a process for the production and subsequent regeneration of carbon membranes as well as to novel types of carbon hollow fibre membranes per se derived from particular pretreated precursor materials.

Scientists have been investigating ways of separating components of industrial gas streams for many years. In the petrochemical industry, the separation of paraffins from their corresponding olefins is a major research area. Ways of separating carbon dioxide from gas streams, for example, to try to reduce the impacts of global warming and ways of recovering hydrogen from gas streams, e.g. where hydrogen can be recycled, have also been widely investigated.

In general, gases such as carbon dioxide and/or hydrogen are separated from gas mixtures with, for example, methane, nitrogen and/or carbon monoxide by reversible absorption methods employing various chemical and/or physical solvents, or by reversible adsorption in beds of adsorbents (e.g. activated carbon). As conventional processes for treating carbon dioxide and hydrogen are highly energy consuming and depend on the use of additional chemicals, the cost as well as the increased demand for environmental protection enforce more efficient processes to evolve beyond the thermal age of separation processes. Membrane technology is such a non-thermal separation technique. Membrane separation also significantly reduces weight and space requirements.

Carbon membranes have been studied for over two decades and are known to have both high permeability of gases and high selectivity.

Saufi et al in Carbon 42 (2004) 241-259 summarise the general conditions for the fabrication of carbon membranes. They state that the formation of such membranes typically involves six stages: (1) precursor selection, (2) polymeric membrane preparation, (3) pre-treatment, (4) pyrolysis/carbonisation, (5) post-treatment, (6) module construction.

The choice of the precursor is important since different precursors bring about different kinds of carbon membranes. Suitable precursors include thermosetting resins, graphite, coal, pitch, fibre materials from plants (e.g. cellulose) and more recently synthetic polymers such as polyamide, polyimide and polyacrylonitrile. Phenolic resins and cellulose are materials which have been widely used to produce carbon membranes.

GB 2207666, for example, discloses cellulose containing membranes. U.S. Pat. No. 4,685,940 also describes carbon membranes made from regenerated cellulose.

Previously, the present inventors have reported membranes formed from a mixture of cellulosic and hemicellulosic components treated with an acid such as trifluoroacetic acid. This treatment causes depolymerisation of the cellulosic components down to oligo- or monosaccharides which can be formed into advantageous carbon membranes, in particular flat membranes.

The present invention is primarily directed towards membranes formed from hollow fibres where a spinneret is required to manufacture the hollow fibres. Current spinnerets tend to be acid and base sensitive and whilst they are capable of acting in the presence of an acid or a base, they require more regular replacement. There remains an economic need therefore to provide valuable hollow fibre membranes which can be manufactured in the absence of acid and base. Alternative polymers like polyimides can be spun in the absence of acid and base, however these polymers are engineered and more expensive.

The present inventors have surprisingly found that carbon membranes formed from cellulose esters can give rise to membranes of particularly advantageous composition. The inventors have found that when such cellulose esters are dissolved in a solvent they can be spun and then deesterified.

The inventors have also surprisingly found that such carbon membranes can be regenerated readily. Carbon membranes are known to suffer from aging effects, i.e. they show permeability loss over time. Various regeneration techniques are known in the art. These include thermal regeneration, chemical regeneration, electrothermal regeneration, ultrasonic regeneration, and microwave regeneration. Of these, the thermal, chemical and microwave techniques are not favoured since they are energy intensive and cannot be carried out online. Rather, the membrane needs to be regenerated whilst not performing its intended function. This down time is not economically viable on an industrial scale. Two sets of membranes could, of course, be used but this has cost implications.

Moreover, thermal regeneration has the further drawback of potential carbon burn out. Chemical regeneration requires time-consuming and expensive post treatment, i.e. chemical removal operations, and microwave regeneration requires much energy and the use of suitable housing and resistant potting materials.

The continuous matrix of graphene sheets of the carbon membranes makes them conductive and facilitates electrothermal regeneration. Electrothermal regeneration has the added benefit that it can be carried out online by passing current through the membrane as the separation process continues. The carbon membranes of the invention are surprisingly able to be electrothermally regenerated in this fashion.

Thus, viewed from one aspect the invention provides a process for the production of a carbon hollow fibre membrane comprising:

(i) dissolving at least one cellulose ester in a solvent to form a solution;
(ii) spinning the solution to form hollow fibres;
(iii) deesterifying said hollow fibres with a base or an acid in the presence of an alcohol;
(iv) if necessary, drying said fibres;
(v) carbonising the fibres;
(vi) assembling the carbonised fibres, e.g. in a module housing, to form a carbon hollow fibre membrane.

Viewed from another aspect the invention provides a process for the production and use of a carbon hollow fibre membrane comprising:

(i) dissolving at least one cellulose ester in a solvent to form a solution;
(ii) spinning the solution to form hollow fibres;
(iii) deesterifying said hollow fibres with a base or an acid in the presence of an alcohol;
(iv) if necessary, drying said fibres;
(v) carbonising the fibres;
(vi) assembling the carbonised fibres, e.g. in a module housing, to form a carbon hollow fibre membrane;
(vii) using said membrane to separate fluid mixtures; and
(vii) simultaneously or subsequently regenerating carbonised fibres by passage of current.

Viewed from another aspect, the invention provides a carbon hollow fibre membrane obtainable by the process as hereinbefore defined.

Viewed from another aspect, the invention provides use of a carbon hollow fibre membrane as hereinbefore defined in the separation of fluid mixtures, e.g. gas mixtures, especially in separating carbon dioxide or hydrogen from mixtures containing the same, or separating an alkene from an alkane, or separating nitrogen from hydrocarbons or nitrogen from oxygen.

Viewed from another aspect, the invention provides a method for separating a fluid from a fluid mixture comprising said fluid, e.g. in separating carbon dioxide or hydrogen from mixtures containing the same, or separating an alkene from an alkane, or separating nitrogen from hydrocarbons, comprising passing said fluid mixture through a carbon hollow fibre membrane as hereinbefore defined.

In particular, the invention lies in the use of a deesterification stage in which an alcohol is present with subsequent carbonisation so viewed from a still further aspect the invention provides a process for the production of a deesterified carbonised hollow fibre comprising:
(i) dissolving at least one cellulose ester in a solvent to form a solution;
(ii) spinning the solution to form hollow fibres; and
(iii) deesterifying said hollow fibres in the presence of an alcohol;
(iv) if necessary, drying said fibres; and
(v) carbonising the fibres.

Hollow fibres made by this process form a still further aspect of the invention.

The process of the invention requires the use of at least one cellulose ester. By cellulose is meant the main polysaccharide in plants, e.g. a polymer of beta-D-glucose units linked together with elimination of water to form chains comprising, for example, 2000 to 4000 units.

The cellulose esters of use in this invention may be mono-, di- or triesters. Also, a mixture of different cellulose esters could be employed, however it is preferred if a single cellulose ester is employed. Suitable cellulose esters include cellulose acetate, cellulose propionate, cellulose butyrate, cellulose acetate-propionate, cellulose acetate-butyrate, cellulose propionate-butyrate and mixtures thereof. Cellulose esters comprising cellulose acetate are particularly preferred, e.g. mono-, di- and triacetates of cellulose. Cellulose esters, in particular cellulose acetate, are commercially available.

The ester, e.g. acetate, content of the cellulose esters of use in the invention may be 20 to 60 wt %, e.g. 30 to 50 wt %. The molecular weight of the cellulose ester may be 10,000 to 700,000 amu, e.g. 20,000 to 150,000 amu.

To effect spinning of the cellulose ester, it is necessary to form a solution. Any solvent or mixture of solvents which is capable of dissolving the cellulose ester in question can be used for this purpose although it is preferred if the solvent in question is non-hazardous and non-corrosive. Suitable solvents include DMSO, THF, gamma-butyrolactone, caprolactone, acetone, N,N-dimethylacetamide, DMF, 1,5-dimethyl-2-pyrrolidone, dioxane, glycol ethers, alkyl acetates, glycol sulphite, phenol, pyridine and NMP (N-methyl-2-pyrrolidone). Preferred solvents are acetone, DMSO and NMP.

It is also with the scope of the invention for a non-solvent (for the cellulose ester) to be mixed in with the solvent. Preferably, the non-solvent is water. The inventors have found therefore that hollow fibres can be successfully spun using the combination of a solvent for the cellulose ester, e.g. as listed above, and water.

A non-solvent induces instantaneous demixing and hence a highly porous substructure and a thinner outer skin. A further benefit of the inclusion of water during spinning is that the cellulose ester does not need to be dried before it is dissolved, as the water content can be calculated into the composition. The mixture of polymer, solvent and non-solvent(s) is here termed "dope".

The amount of cellulose esters in the solvent can vary over wide limits, e.g. up to a saturated solution. Preferably however the amount of cellulose esters is between 15 and 40 wt %, e.g. 20 to 30 wt % of the solution used.

The amount of non-solvent present may be from 0 to 20 wt % of the solution, preferably less than 10 wt %, especially less than 5 wt %.

A particular issue with the spinning of cellulose esters is the formation of macrovoids in the solidified fibre structure. Various methods are known for reducing the incidence of such voids. For example, the addition of polyvinylpyrrolidone (PVP) or polyethylene glycol (PEG) has been found to influence the kinetics of the phase inversion process due to an increase in dope solution viscosity. This reduces the diffusion rates of solvent and non-solvent hence slowing down the demixing process. In a preferred embodiment therefore the solution of cellulose ester and solvent additionally comprises an additive suitable for preventing macrovoid formation, e.g. PVP or PEG. Where doping with PVP or PEG occurs, it is preferred if the PVP/PEG employed has a relatively low Mw, e.g. less than 50,000 amu, preferably less than 25,000 amu.

Any additional components present such as PVP or PEG will typically form less than 40 wt % of the solution, e.g. 2 to 5 wt %.

In a further preferred embodiment at least one metal salt is added to the solution of cellulose ester prior to spinning. The addition of a metal salt is believed to enhance the conductivity of the membrane thus allowing better regeneration thereof, and to increase the selectivity of the membrane.

In principle, the metal salt may be composed of any metal. Suitable metal salts include transition metal salts and Si salts (which shall be deemed to fall within the term metal in this case). Especially preferred metals include Ca, Mg, Fe (e.g. $Fe^{3+}$), Si, Ag, Cu, Ni, Zn, Na and Li. The salt may be an oxide, chloride, sulphate or nitrate, especially a nitrate. Highly preferred compounds are iron (III) nitrate, copper nitrate and nickel nitrate.

The amount of metal salt added needs to be carefully controlled to enhance conductivity and selectivity, but prevent brittleness in the formed membrane. Too high metal loading results in carbon membranes that are too brittle. Also, in applications where sufficient selectivity is surpassed, the metal content should be reduced to increase the permeability. Hence, a trade-off between mechanical properties, selectivity, permeability and the enhancement of electric conductivity exists. Suitable amounts relative to the weight of the polymer include 0.5 to 6 wt %, e.g. 1 to 5 wt %.

The spinning process is preferably carried out with an organic solvent, hence it is neutral, avoiding any corrosion issues.

In the spinning process the cellulose ester solution is fed by the force of a pump to the spinneret, which may be at room temperature or heated, and subsequently extruded. The spinning solution is preferably at room temperature or may be heated. A bore liquid is passed through the centre of the spinneret to ensure that the fibres which form are hollow. The fibres pass out of the base of the spinneret and eventually into a coagulation bath. There is however, an air gap between the base of the spinneret and the coagulation bath. The presence of an air gap allows solvent evaporation and also allows the fibres to stretch and straighten under their own weight. This hollow fibre spinning technology is well known to the skilled person.

In the spinning process, flow to the spinneret is typically controlled so that the dope flow rate is preferably 0.1 to 15 ml/min, e.g. 0.5. to 10 ml/min such as 0.5 to 5 ml/min. In some embodiments dope flow rate is preferably 1 to 15 ml/min, e.g. 2 to 3 ml/min.

The bore flow rate may be up to 300%, preferably up to 200% of the dope flow rate, especially up to 150% of the dope flow rate. In some embodiments the bore flow rate is typically 30 to 90% of the dope flow rate. Faster bore flow rates mean a larger lumen and hence thinner fibre walls.

The bore liquid composition can vary widely however, typically it comprises a mixture of water and a solvent for the cellulose ester, e.g. the solvent used to form the solution of cellulose ester. In particular, a mixture of water and NMP is preferred. Preferably, the solvent will form the larger part of the bore liquid composition, e.g. at least 60 wt % of the bore liquid composition.

This type of spinning process is often termed "dry-wet spinning" and is different from melt spinning or electrospinning. This term is well known to those in the art.

Once the nascent hollow fibres have been extruded by the spinneret they pass down into a coagulation bath. The air gap between the spinneret and the coagulation bath may be as great as 600 mm according to the invention, however it will preferably be of the order of 5 to 50 mm. The atmosphere in the air gap may be controlled by a chimney apparatus, allowing control of the temperature, humidity and composition of the gas in this air gap.

The coagulation bath is preferably heated to at least 30° C., e.g. 40 to 90° C., preferably approximately 50° C. This ensures a better porosity profile and the formation of a thinner outer skin.

The bath preferably contains water but other non-solvents could also be employed. Additionally, small amounts of solvents or salts may be added.

Once formed, the hollow fibres are typically washed. This may be achieved by moving the fibres from the coagulation bath through a rinsing bath (typically of water) to a storage bath containing flowing water where they may remain for up to 48 hours, to remove excess solvent. The transport of the fibres (typically by a take-up wheel) to a storage bath is well known. After a period of time in the storage bath the fibres are ready for the next stage of the claimed process or ready for temporary storage. Fibres are typically stored under aqueous glycerol to prevent any pores collapsing and to prevent the bore collapsing or are dried using a known solvent exchange method. The content of glycerol may be 10 to 50 vol % relative to water.

Preferably the fibres may be collected on a flexible yarn spool immediately after spinning. The whole spool may then be transferred to the water storage bath for rinsing, on to the glycerol bath (if necessary), on to the deesterification bath and then to a drying oven or solvent exchange baths.

After hollow fibre formation, it is necessary to deesterify the spun fibres. It is an essential feature of this invention that deesterification takes place after hollow fibre formation.

Deesterification is necessary to allow subsequent carbonisation of the fibres. In the absence of deesterification, cellulose esters carbonise to form what is essentially carbon powder as levoglucosane does not form. A complete deesterification is not necessary, but it must be sufficient to maintain mechanical strength of the carbon fibres while providing the desired selectivity.

Deesterification can be effected on fibres which have been treated in the aqueous glycerol medium or have been dried. Deesterification can also be effected on fibres directly from the spinning procedure, e.g. after they have been washed, but this will greatly reduce their mechanical strength.

Deesterification takes place in the presence of an alcohol. Any alcohol can be used here as long as it swells the fibre, but does not detrimentally affect its mechanical properties. Mixtures of alcohols may also be employed. The term alcohol is used here to cover both mono-alcohols, diols and polyols. Alcohols may contain up to 20 carbon atoms, e.g. up to 10 carbon atoms, especially up to 5 carbon atoms. Preferred alcohols include methanol, ethanol, propanols or glycerols. It has been documented that the use of an alcohol during deesterification swells the fibres allowing the deesterification procedure to occur not just on the surface of the fibre but also in its bulk (Liu & Hsieh: J Polym Sci Part B Polym Phys 40 (2002) 2119-2129).

The inventors have discovered that propanol is a highly preferred alcohol as it is non-hazardous, cheap and has been found to work well in combination with water. A preferred propanol content is 5-50 vol %, especially 10-20 vol %.

The actual deesterification reaction is effected using a base, preferably a strong base such as a hydroxide. The base/alcohol mixture can also contain water. Preferred bases include potassium hydroxide, sodium hydroxide, ammonium hydroxide and hydrazine. NaOH is especially preferred.

The concentration range of base can vary but suitable concentrations include 0.005-0.5M, preferably 0.01-0.2M, especially 0.05-0.10 M. The presence of additives such as PVP can affect the concentration required in this stage but the skilled person will be able to utilise appropriate concentrations of base.

The exposure time to base can vary, e.g. from 0.1 hour to 5 hours, such as 20 mins to 2 hrs. Ambient temperature is appropriate. Higher temperature may be applied to accelerate the process. Again, it should be pointed out that complete deesterification is not essential to obtain high performance carbon membranes.

After deesterification the fibres may be washed, e.g. with water before being dried. Drying can be achieved in any conventional way, e.g. by ambient drying followed by exposure in a vacuum oven. By starting the drying process with slow drying, it is envisaged that homogeneity is improved. Drying may also be carried out in an oven at atmospheric pressure (air or $N_2$) and elevated temperatures, in vacuum ovens at reduced temperatures or in microwave ovens and the like. Drying temperatures of up to 120° C. are suitable. Drying can take as long as it takes for the weight of the fibre to remain constant, typically up to 24 hrs. A highly preferred drying method is the solvent exchange method, which may be applied at ambient temperatures and is less time-consuming.

Where the fibres at this point are on a spool, the fibres must then be cut into suitable lengths determined by the spool size and the number of spool arms. The spool or any other collection device must be flexible (contractable), to allow for shrinkage of fibres during deesterification and drying of fibres.

The carbonisation process is a further important step in the manufacture of carbon membranes. The precursor hollow fibre is typically heated under a controlled atmosphere at a specific heating rate for a certain period. The process allows the production of carbon membranes having certain microporosity of molecular dimensions which is responsible for the molecular sieve properties of the carbon membrane.

In the present invention, carbonisation is preferably carried out under vacuum or under an inert atmosphere, e.g. of nitrogen, carbon dioxide, argon, helium or a mixture thereof. The use of carbon dioxide, or the above mentioned other gases with trace amounts of oxygen, is especially preferred as it encourages mild oxidation of the highly reactive carbon atoms at the edge of the graphene sheets that form during the carbonisation process. Normally, these reactive atoms oxidise in air after the carbonisation process. By carrying out the carbonisation reaction in carbon dioxide, this oxidation reaction can occur during carbonisation thus preventing subsequent membrane ageing effects. The average pore size is also slightly increased.

Figure 2:
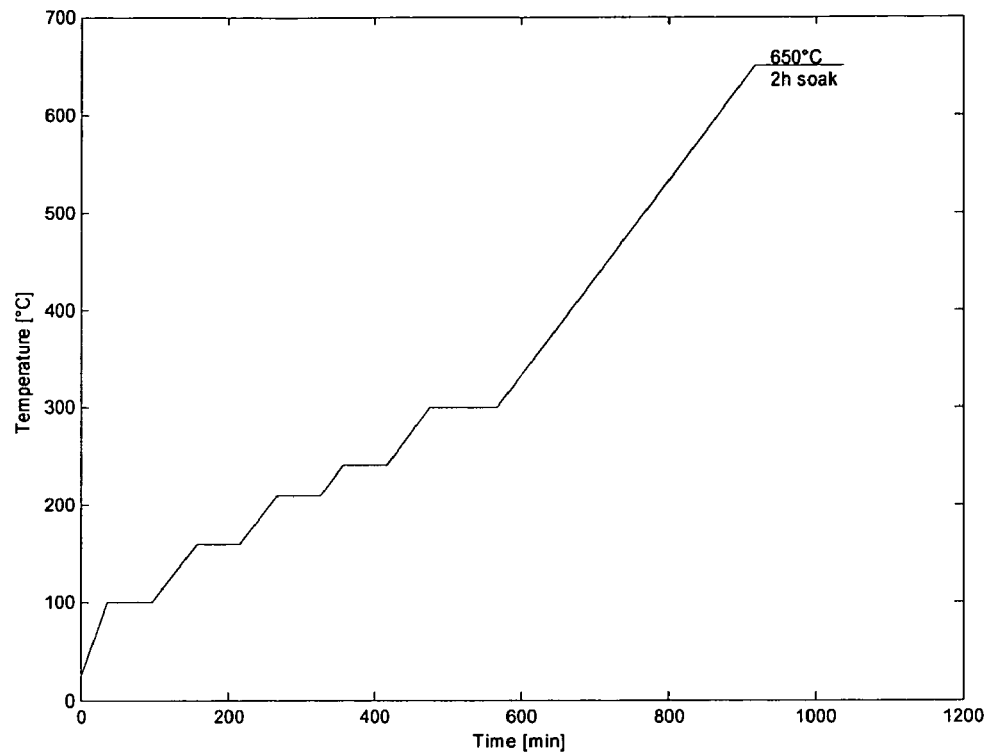

The final carbonisation temperature may be in the range 300 to 1200° C., preferably 500 to 750° C., e.g. 650° C. The heating rate may be 0.5 to 10° C. per minute, e.g. 1° C. per minute although during the heating procedure, there should be various periods of no heat increase, where temperatures are simply maintained. These periods are called dwells. There may be several dwells, e.g. 2 to 7 dwells during the carbonisation process. These may last approximately 0.5 to 2 hours, e.g. 1 hour in duration and are preferably evenly spread throughout the heating process. FIG. 2 shows a suitable heating protocol which could be manipulated by the skilled person.

The first two dwells are believed to be important in removing residual traces of water and solvent. The carbonisation process therefore preferably comprises at least two dwells. The subsequent dwells allow the carbon matrix to rearrange and form micropores in between turbostratically arranged layers of graphene sheets.

It is conventional to use a carbonisation catalyst during the carbonisation process. A still yet further benefit of the present process is that such a catalyst is not required. Carbonisation can therefore be effected in the absence of a catalyst.

Once the final temperature is reached, the carbonisation process may continue for a further 1 to 5 hours, e.g. 2 hours at this temperature. Thereafter, the fibres are allowed to cool before the furnace is purged with ambient air and the fibres removed.

It is within the scope of the invention to subject the formed carbon membranes to post carbonisation treatment, perhaps to finely adjust pore dimensions and distribution or to repair defects that might exist in the membrane. Such techniques include post-oxidation, chemical vapour deposition, post-pyrolysis and coating. Saufi (supra) summarises potential post carbonisation treatments in his paper. It is an especially preferred embodiment however that the membranes produced in this invention require no such post carbonisation treatment.

The fibres formed after carbonisation and possible post-treatment are ready for use and can be assembled into a membrane, e.g. bundled up and set in resin to form a membrane. Whilst it is within the scope of the invention for the formed membrane to contain only one fibre it will be appreciated that typically a bundle of fibres will be gathered together and held to form the carbon hollow fibre membranes of the invention.

The fibres are typically adhered to each other with a non-reactive adhesive such as an epoxy resin as is well known in the art. One end of the hollow fibre may also be sealed, e.g. using the adhesive. The formed membranes thus separate gases as the permeant gases diffuse through the pores in the hollow fibre walls and into the centre of the fibre where they diffuse out the open end of the fibre to be collected, thereby separating gases from each other. The formed membranes may also separate gases by having the feed on the bore (centre) side of the fibres, and the permeants diffusing to the shell (outer) side of the fibres.

Carbon membranes formed by the process of the invention have wall thicknesses in the range 0.5 to 100 μm, e.g. 1 to 50 μm, e.g. 15 to 30 μm. Pore sizes are generally in the range 0.2 to 1 nm, e.g. 0.25 to 0.6 nm and are preferably uniform in size. The hollow fibres are typically around 100 to 400 μm in outer diameter.

As mentioned above, the carbon membranes of the invention can be electrothermally regenerated. Thus, a current can be applied across the membrane to induce regeneration. Moreover, this can be carried out whilst the membrane is in use. The electrothermal regeneration process necessitates the fixing of either end of the hollow fibre bundle with a conductive component, i.e. a conductive resin, which is subsequently attached to wires delivering the current. The application of current across the membrane does not affect its ability to separate gas mixtures. In some situations, e.g. for the separation of carbon dioxide, permeability is actually increased while selectivity is maintained. Without wishing to be limited by theory, it is envisaged that an adsorbed gas, such as carbon dioxide, may be quickly and efficiently desorbed from the membrane by the passage of a direct or alternating current, or pulsed current. The van der Waals forces between the carbon skeleton and the carbon dioxide are disrupted or perhaps reversed by the electric current and the ohmic heating. As a result, adsorbed carbon dioxide is released or repulsed from the micropore surface and desorption occurs. The same effect may apply to other adsorbed gases.

The current applied across the membrane can vary but must not be so high as to cause burning in the membrane. A 0.1 to 1000 μAmp/cm fibre or 1-10,000 μW/cm fibre is appropriate although this may vary depending on the cross-section and length of the carbon membrane. The inventors have found that the effect of applied electric current depends on the current density, gas type, pressure, temperature, membrane conductivity, amount of pre-adsorbed gas and pore size. The effect may also be dependent on the direction of the electron flow relative to the direction of feed gas flow in a hollow fibre module. The inventors have also found that the regeneration process can be carried out not only periodically but also continuously to maximise gas separation.

Thus viewed from a further aspect the invention provides a process for the separation of a fluid from a fluid mixture comprising said fluid, said process comprising passing said fluid mixture through a carbon membrane as hereinbefore defined, said membrane being periodically or continuously regenerated by passage of current therethrough.

Fluids, e.g. gases which can be separated from fluid mixtures using the membranes of the invention include carbon dioxide, hydrogen, nitrogen and hydrocarbons, e.g. the separation of hydrocarbons from inert gas(es). Preferred separated combinations include hydrogen/methane, hydrogen from natural gas, carbon dioxide from biogas or natural gas, separation of any component hydrogen/carbon dioxide/methane/carbon monoxide from coal gasification or steam reforming of hydrocarbons, separation of $CO_2$ from flue gases, separation of an alkene from an alkane, and separation of nitrogen from hydrocarbons. The membranes separate gases by being selectively more permeable to certain gases than others as shown in the examples which follow.

In particular, the inventors envisage their membranes to be useful for nitrogen enrichment for blanketing and storage etc, for hydrogen recovery from hydrocarbons, for carbon dioxide separation from natural gas or flue gas, for precombustion separation of carbon dioxide and hydrogen and for alkene/alkane separation.

A particularly favourable use involves the separation of NF$_3$ or other fluorocompounds, especially perfluorocompounds, from mixtures comprising the same, e.g. inert gas mixtures.

The membranes of the invention are surprisingly stable in air and this allows their application in the separation of all manner of air mixtures. For example, membranes of the invention can be used for oxygen depletion, e.g. to form hypoxic air (typically having an oxygen content of 15-16%). The membranes can be used to deplete oxygen from combustion air (e.g. to around 15-16%).

Air separation therefore forms a still yet further preferred aspect of the invention which therefore provides a process for the separation of a component of air, e.g. oxygen, from air said process comprising passing air through a carbon membrane as hereinbefore defined. Optionally said membrane is periodically or continuously regenerated by passage of current therethrough.

The stability of the membranes also allows their use in the separation of more aggressive gases such as chlorine or HCl from mixtures thereof, e.g. mixtures with inert gas/gases. It may be necessary to pretreat a membrane before being used to separate these aggressive gases. A pretreatment step could involve simply dipping the membrane in a perfluoro compound bath. So whilst the membrane may need to be treated before being used to separate aggressive gases the fact that they can be used at all is remarkable.

The membranes of the invention may be used in membrane reactors, with or without the presence of a catalyst. Preferred membrane reactors of use here typically comprise a catalyst-filled reaction chamber with a membrane to add reactants or remove products of the reaction. The catalyst may even be incorporated into the membrane.

The membranes may also be useful for liquid separations, e.g. separation of salts from water, alcohols from water or oils from water.

In general the use of the membranes of the invention results in a fluid separation solution which has an overall lower operating cost than the market solution today.

It will be appreciated that the pore size of the membrane is an important feature when determining which gases a membrane should be used to separate. Pore sizes need to correspond to the size of the target separation fluids. For $H_2/CO_2$ separation average pore size should be low but for separation of higher hydrocarbons (C2+) pore sizes need to be increased and so on. The description above suggests various options available for pore size adjustment.

It is especially preferred if the membranes of the invention, with suitable pore sizes, are employed in biogas upgrading.

The way in which the membrane is installed in a suitable device or module may affect the membrane performance. The person skilled in the art can tailor modules to suit his needs. Thus, it may be possible to use a series of carbon membranes made by the above process having different pore sizes.

Whilst the invention has been described in the context of hollow fibre membranes, it is envisaged that the principles described herein could also be employed in the manufacture of other membranes, in particular, flat membranes where, for example, a film of cellulose ester in solvent is cast rather than a hollow fibre spun. The principle of using a cellulose ester, alcoholic deesterification and subsequent carbonisation may be applied to the formation of a wide variety of carbon membranes and this forms a further aspect of the invention.

The invention will now be further described with reference to the following non-limiting examples and figures.

BRIEF DESCRIPTIONS OF THE FIGURES

FIG. 1 shows an experimental set-up for carbonisation. The precursor membrane (not shown) is placed inside a quartz tube (1) sealed by stainless steel end clamps and rubber gaskets (2). Heating is effected using tubular furnace (3). The carbonisation reaction takes place in a vacuum or an inert gas atmosphere, so tube (1) is connected to a vacuum pump (4) or to a ventilation point (which can be closed off via a diaphragm valve(5)). If vacuum is used, the cold trap (6) condenses any vapours emitted during the carbonisation process and any particulate material is collected in the particle filter (7). A pressure transmitter (8) measures the pressure in the system. If inert gas is used, a flow controller (9) is used to set the flow rate of gas coming from the gas supply cylinder (10).

FIG. 2 shows a typical carbonization protocol. A cooling rate of 5° C./min was usually applied (the actual cooling rate can not be maintained that high as the temperature approaches ambient temperature, due to the limited driving force).

Figure 3:
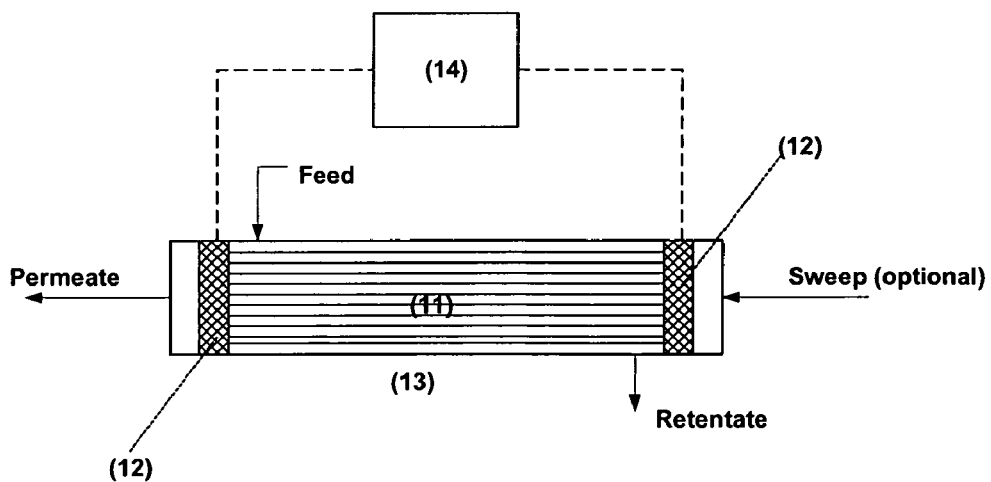

FIG. 3 shows an experimental set-up for a membrane module and electrothermal regeneration. The carbon hollow fibre bundle (11) is held in place using a tube sheet of adhesive including an electrically conductive part (12). One or several small holes on each end of the non-conducting housing (13) allows cables to be connected to opposite sides of the membrane bundle. Power is supplied from a supply (14) which may give DC, AC or pulsed current.

EXAMPLE 1

Spinning Hollow Fibres

Cellulose acetate (CA) hollow fibres were spun from a dope containing 22.5 wt % CA, 5.0 wt % PVP and balance NMP. The CA was not dried and contained up to 5 wt % water. The dope flow rate was 2.2 ml/min, while the bore liquid flow rate was 0.9 ml/min (both solutions at ambient temperatures). The bore liquid composition was 15 vol % deionised water and 85 vol % NMP. The air gap was 25 mm, and the coagulation bath was tap water at 50° C. The resulting fibres were stored in tap water for 24 hrs to remove excess solvent, and then transferred to a bath containing 10 vol % glycerol in tap water. SEM pictures showed a thin (~1 micron) skin on the shell side, while the porosity increased towards the lumen side.

EXAMPLE 2

Deesterification

Some of the fibres (hereafter called A) referred to in Example 1 were then deacetylated (deesterified) using 0.075M NaOH in a mixture of 50 vol % 2-propanol and 50 vol % deionised water for 2 hrs at ambient temperature. After this treatment, the fibres were washed in tap water for 5 minutes.

Similar fibres (hereafter called B) were deacetylated using 0.075M NaOH in alcohol-free water (deionised) for 2 hrs at ambient temperature. After this treatment, the fibres were washed in tap water for 5 minutes.

Another batch of fibres (hereafter called C) that was spun in the same way as A, but with a small amount of copper nitrate added (2% of the CA weight), was deacetylated using 0.075M NaOH in 96% ethanol (4% water) for 2 hrs at ambient temperature. After this treatment, the fibres were washed in tap water for 5 minutes.

EXAMPLE 3

Drying and Carbonization

Fibres A, B and C were then dried in an oven at 105° C. at atmospheric pressure for 18 hours under a certain force to avoid the fibres from curling up. After drying, the fibres were cut open in both ends, and transferred to the carbonization furnace (FIG. 1). The furnace was evacuated overnight to remove air, and then filled with $CO_2$ until atmospheric pressure was exceeded. The superficial $CO_2$ flow rate was set to 4.0 cm/min, meaning 230 ml/min for this system. Then the protocol pictured in FIG. 2 was started. After the system had cooled to less than 50° C., the flow rate was checked and the furnace was opened.

Some fibres from batch C were carbonized according to the above mentioned procedure, except that the inert gas was nitrogen. These carbon fibres are hereafter called D.

EXAMPLE 4

Module Making and Permeation Measurements

A fibre from each carbonized batch was mounted in single tee modules made by standard ¼" Swagelok® parts and tubing (all stainless steel). One end of the fibre was sealed (blind end; no sweep possible on permeate side) by Huntsman Araldite® 2012. The feed entering on the shell side of the fibre was isolated from the permeate using a tube sheet of the same epoxy.

The table below shows single gas results for a single-fibre modules using the standard pressure-rise method with vacuum on the permeate side. All gas tests were carried out at 30° C. and a feed pressure of 2 bara. The permeation rig was evacuated overnight between each gas test. The tests were run for several hours or days to ensure that the transient phase of diffusion was passed. The leak rate was subtracted in each gas test.

EXAMPLE 5

Electrothermal Treatment of a Carbon Fibre Bundle

A bundle of 100 carbon fibres (without any metal loading) mounted in a suitable housing was wired at both ends, to a 15V DC power supply. Pure $CO_2$ at 3 bar was fed to the shell side while the permeate side was at atmospheric pressure (i.e. no sweep gas). The system was at ambient temperature. The permeate flow rate was measured by a soap bubble meter. An immediate increase in the $CO_2$ permeance of approximately 20% was observed when the current was applied.

The results for fibre A and B shows the importance of using alcohol as part of the reaction medium during deesterification. 50% 2-propanol results in very selective membranes with low permeability, while pure water results in the opposite situation, probably due to a low degree of deacetylation.

The results for fibre C and D shows the increase in permeability when using $CO_2$ as carbonization atmosphere instead of nitrogen. The selectivity is reduced, but is still acceptable.

All fibres have also been tested at 15 bar (against vacuum) with selected gases, and showed no failure. However, the trend is a small decrease in permeance at high pressure for fibres carbonized under nitrogen. For fibres carbonized under $CO_2$, the permeance is independent of pressure, which is a further advantage of using $CO_2$ as carbonization atmosphere.

The invention claimed is:

1. A process for the production of a deesterified, carbonised hollow fibre comprising:
    (i) dissolving at least one cellulose ester in a solvent to form a solution;
    (ii) spinning the solution to form hollow fibres; and
    (iii) deesterifying said hollow fibres in the presence of an alcohol;
    (iv) if necessary, drying said fibres;
    (v) carbonising the fibres.

2. A process for the production of a carbon hollow fibre membrane comprising:
    (i) dissolving at least one cellulose ester in a solvent to form a solution;
    (ii) dry/wet spinning the solution to form hollow fibres;
    (iii) deesterifying said hollow fibres with a base or an acid in the presence of an alcohol;
    (iv) if necessary, drying said fibres;
    (v) carbonising the fibres;
    (vi) assembling the carbonised fibres to form a carbon hollow fibre membrane.

3. A process for the production and use of a carbon hollow fibre membrane as claimed in claim 2 comprising:
    (i) dissolving at least one cellulose ester in a solvent to form a solution;
    (ii) dry/wet spinning the solution to form hollow fibres;
    (iii) deesterifying said hollow fibres with a base or an acid in the presence of an alcohol;
    (iv) if necessary, drying said fibres;
    (v) carbonising the fibres;

TABLE 1

Permeation results at 30° C. and 2 bara.

| Carbon membrane | Wall thickness (micron) | $H_2$ ($P_{H2}/P_{CH4}$) | $N_2$ ($P_{CO2}/P_{N2}$) | $CH_4$ | $O_2$ ($P_{O2}/P_{N2}$) | $CO_2$ ($P_{CO2}/P_{CH4}$) | $H_2$ repeat ($P_{H2rep}/P_{H2}$) |
|---|---|---|---|---|---|---|---|
| A | 25 | 0.024 (19000) | $9.5 \times 10^{-6}$ (53) | $1.3 \times 10^{-6}$ | $2.1 \times 10^{-4}$ (22) | $5.0 \times 10^{-4}$ (381) | 0.026 (1.08) |
| B | 28 | 0.069 (9.7) | $5.4 \times 10^{-3}$ (1.7) | $7.2 \times 10^{-3}$ | $6.0 \times 10^{-3}$ (1.1) | $9.3 \times 10^{-3}$ (1.3) | 0.070 (1.01) |
| C | 27 | 0.077 (627) | $3.9 \times 10^{-4}$ (41) | $12.3 \times 10^{-5}$ | $4.2 \times 10^{-3}$ (11) | 0.016 (129) | 0.078 (1.01) |
| D | 28 | 0.020 (4776) | $2.1 \times 10^{-5}$ (48) | $0.42 \times 10^{-5}$ | $3.5 \times 10^{-4}$ (16.5) | $1.02 \times 10^{-3}$ (241) | $2.3 \times 10^{-5}$ (N2) (1.06) |

Permeance given in [$m^3$(STP)/($m^2$ h bar)] and selectivity in parenthesis.

(vi) assembling the carbonised fibres to form a carbon hollow fibre membrane;
(vii) using said membrane to separate fluid mixtures; and
(vii) simultaneously or subsequently regenerating carbonised fibres by passage of current.

4. A process as claimed in claim 2 wherein the cellulose ester is cellulose acetate.

5. A process as claimed claim 2 wherein cellulose ester is dissolved in NMP or DMSO.

6. A process as claimed claim 2 wherein there is water present in the solution of step (i).

7. A process as claimed claim 2 wherein there is PVP or PEG is present in the solution of step (i).

8. A process as claimed claim 2 wherein there is a metal salt present in the solution of step (i).

9. A process as claimed claim 2 wherein the alcohol is isopropanol.

10. A process as claimed claim 2 wherein carbonisation is effected in a carbon dioxide atmosphere.

11. A carbon membrane obtainable by the process for the production of a carbon hollow fibre membrane comprising:
  (i) dissolving at least one cellulose ester in a solvent to form a solution;
  (ii) dry/wet spinning the solution to form hollow fibres;
  (iii) deesterifying said hollow fibres with a base or an acid in the presence of an alcohol;
  (iv) if necessary, drying said fibres;
  (v) carbonising the fibres;
  (vi) assembling the carbonised fibres to form a carbon hollow fibre membrane.

12. A method for separating a fluid from a fluid mixture comprising said fluid the method comprising passing said fluid mixture through a carbon hollow fibre membrane of claim 11.

13. A method as claimed in claim 12 wherein the separating step comprises enriching the nitrogen content of a gas, hydrogen recovery from hydrocarbons, carbon dioxide separation from natural gas or flue gas, precombustion separation of carbon dioxide and hydrogen, and alkene/alkane separation.

14. A method as claimed in claim 12 for the separation of $NF_3$ or other fluorocompounds from a mixture comprising the same.

15. A method as claimed in claim 12 for the separation of a component of air, from air.

16. A method as claimed in claim 12 for the separation of aggressive gases from a fluid mixture.

17. A method as claimed in claim 12, said membrane being periodically or continuously regenerated by passage of direct or alternating current.

18. A method for upgrading a biogas comprising contacting the biogas with a carbon hollow fibre membrane of claim 11.

* * * * *